United States Patent [19]

Robinson et al.

[11] 4,309,403
[45] Jan. 5, 1982

[54] THERMOCHEMICAL GENERATION OF HYDROGEN AND OXYGEN FROM WATER

[75] Inventors: Paul R. Robinson, Knoxville; Carlos E. Bamberger, Oak Ridge, both of Tenn.

[73] Assignee: The United States of America as represented by the United States Department of Energy, Washington, D.C.

[21] Appl. No.: 206,804

[22] Filed: Nov. 14, 1980

Related U.S. Application Data

[62] Division of Ser. No. 119,738, Feb. 8, 1980.

[51] Int. Cl.³ .............................................. C01B 1/02
[52] U.S. Cl. .............................. 423/648 R; 423/579; 423/598; 423/599
[58] Field of Search ............ 423/598, 599, 579, 648 R

[56] References Cited

U.S. PATENT DOCUMENTS

| 2,111,460 | 3/1938 | Rockstroh | 423/598 |
| 2,427,709 | 7/1947 | Brimm | 423/599 |
| 4,169,884 | 10/1979 | Bamberger et al. | 423/648 R |
| 4,230,682 | 10/1980 | Bamberger | 423/648 R |

Primary Examiner—Earl C. Thomas
Assistant Examiner—Wayne A. Langel
Attorney, Agent, or Firm—Fred O. Lewis; Stephen D. Hamel; Richard G. Besha

[57] ABSTRACT

A thermochemical cyclic process for the production of hydrogen exploits the reaction between sodium manganate ($NaMnO_2$) and titanium dioxide ($TiO_2$) to form sodium titanate ($Na_2TiO_3$), manganese (II) titanate ($MnTiO_3$) and oxygen. The titanate mixture is treated with sodium hydroxide, in the presence of steam, to form sodium titanate, sodium manganate (III), water and hydrogen. The sodium titanate-manganate (III) mixture is treated with water to form sodium manganate (III), titanium dioxide and sodium hydroxide. Sodium manganate (III) and titanium dioxide are recycled following dissolution of sodium hydroxide in water.

6 Claims, 1 Drawing Figure

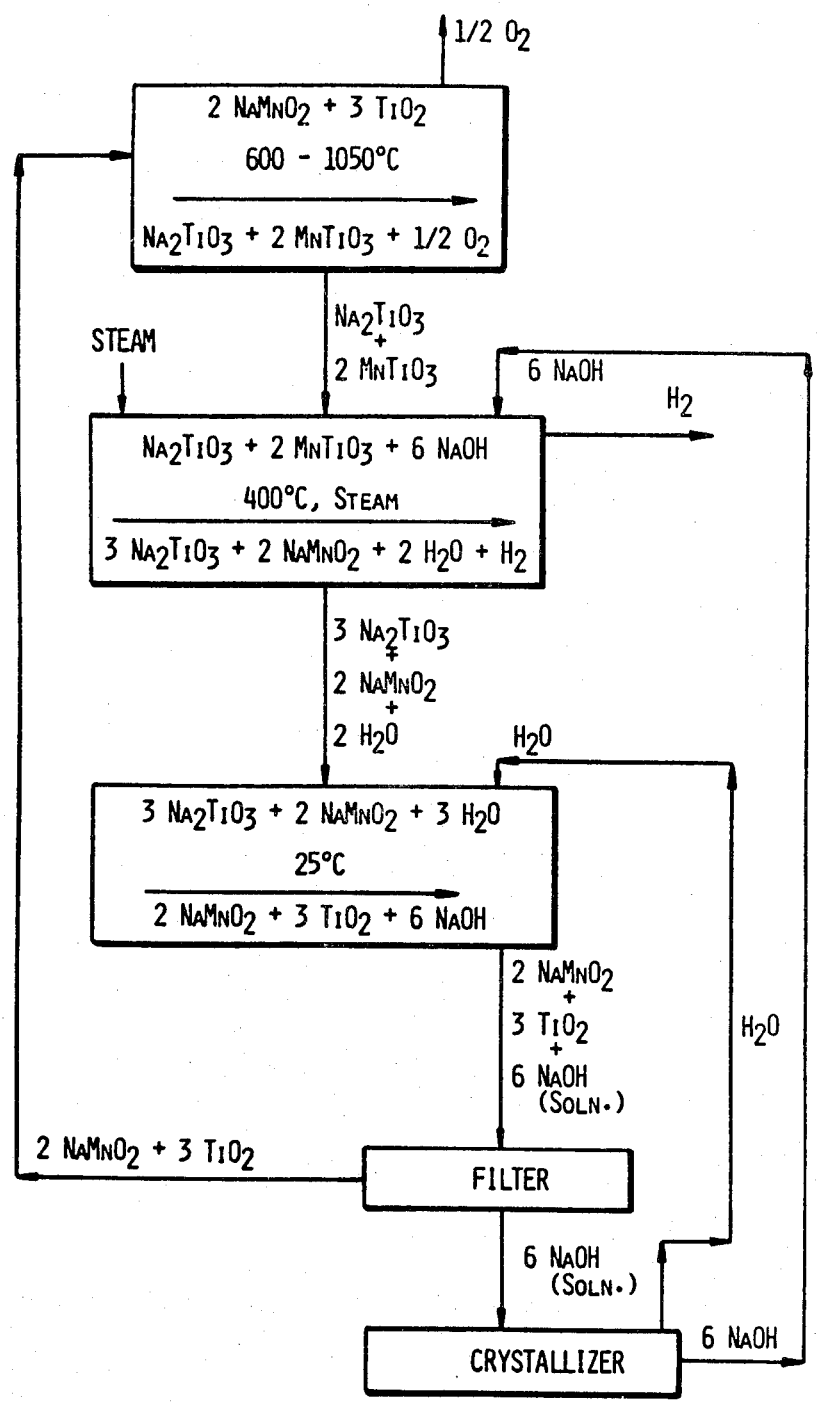

THERMOCHEMICAL GENERATION OF HYDROGEN AND OXYGEN FROM WATER

This is a division of application Ser. No. 119,738, filed Feb. 8, 1980.

This invention is the result of a contract with the U.S. Department of Energy.

BACKGROUND OF THE INVENTION

The invention relates generally to the art of thermochemical hydrogen production.

Hydrogen is considered to be an attractive energy source for development to replace fossil fuels, which are being consumed rapidly and becoming increasingly expensive. The combustion of hydrogen produces no obnoxious products and therefore causes no insult to the environment.

Technology is presently available for adapting existing energy transport means and consuming equipment for hydrogen utilization. Natural gas pipelines, for example, can be converted to hydrogen-carrying pipelines with minor modifications. Experimental automobiles, with modified conventional internal combustion engines, can use hydrogen for fuel.

As the prospect of hydrogen utilization becomes increasingly likely, methods for producing hydrogen need to be upgraded and increased. The conventional source of hydrogen has been electrolysis of water. Electrolysis, however, is highly inefficient owing to inefficiencies of electricity production and a maximum efficiency of about 80 percent for electrolysis. Electrolytic production of hydrogen is limited by the overall futility of using one energy source, typically fossil fuels, at the point of electricity production to produce hydrogen at the point of electrolysis. The disadvantages of using irreplaceable fossil fuels are obviously not overcome by such a process.

Chemically feasible processes for the direct conversion of fossil fuels and water to hydrogen are available and overcome many of the inefficiencies and disadvantages of electrolysis. However, prudence dictates that fossil fuel consumption should be minimized and the fuels conserved for use as chemical intermediates.

Thermochemical processing is therefore a most attractive method for producing hydrogen. By this technique, water is broken down to hydrogen and oxygen in a series of chemical reactions not involving the use of fossil fuels. This series of reactions is preferably carried out in a closed cyclic manner in which all products except hydrogen and oxygen are recycled as reactants. One such process, disclosed in U.S. Pat. No. 3,490,871, utilizes the reaction of cesium with water to release hydrogen.

Another such process, disclosed by Grimes et al in U.S. Pat. No. 3,919,406, involves the reaction of copper and magnesium chlorides with water to produce hydrogen in a cyclic manner.

Another such process is disclosed by Bamberger et al in U.S. Pat. No. 3,927,192. The process therein disclosed comprises reacting chromium oxide with an alkali metal hydroxide to produce hydrogen, water and alkali metal chromate as reaction products.

Bamberger et al (U.S. Pat. No. 3,929,979) also disclose a cyclic process for splitting water, wherein magnetite is reacted with an alkali metal hydroxide to give hydrogen, alkali metal ferrate and water as products.

Bamberger et al, in U.S. Pat. No. 3,996,343, disclose the production of hydrogen in a closed chemical cycle for the thermal decomposition of water by reaction of water with chromium sesquioxide and strontium oxide.

Bamberger et al (U.S. Pat. No. 4,005,184) employ chromium and barium compounds in a thermochemical process for producing hydrogen using barium and chromium compounds.

Ishii et al (U.S. Pat. No. 4,098,875) produce hydrogen thermochemically from water using tri-iron tetraoxide and hydrogen bromide as the main cyclic reaction media. The use of barium iodide, carbon dioxide and ammonia as cyclic reaction media is disclosed in U.S. Pat. No. 3,996,342.

The reaction of cerium compounds with sodium phosphate and sodium carbonate in a thermochemical cycle for producing hydrogen from water or carbon monoxide from carbon dioxide is set forth in commonly assigned application Ser. No. 50,379 filed June 20, 1979.

It has also been proposed in commonly assigned application Ser. No. 47,447, filed June 11, 1979, to produce hydrogen thermochemically in a cyclical process using cerium-oxygen-titanium compounds.

OBJECTS OF THE INVENTION

An object of any thermochemical process is the direct use of heat from an energy-producing facility requiring no fossil fuels, e.g., a nuclear reactor or a solar source.

It is a further object of this invention to provide a novel cyclic thermochemical process for splitting water into hydrogen and oxygen.

A further object of this invention is to provide a thermochemical route to hydrogen, carried out at lower temperatures than previously known processes, which is simpler than known processes by virtue of producing only one soluble material.

These and other objects are accomplished in a three-step process in which sodium manganate (III) is reacted with titanium dioxide to produce sodium and manganese (II) titanates and oxygen. The titanates are treated with hydroxide in the presence of steam to give sodium titanate, sodium manganate (III), water and hydrogen. Sodium titanate and manganate are boiled with water to yield titanium dioxide, sodium manganate (III) and sodium hydroxide. The sodium hydroxide is removed by dissolution in water to permit recycling of the insoluble materials.

SUMMARY OF THE INVENTION

In one aspect this invention relates to a cyclic process for splitting water into hydrogen and oxygen, comprising the steps of:

(a) reacting sodium manganate (III) and titanium dioxide to yield sodium titanate, manganese (II) titanate and oxygen;

(b) reacting sodium titanate and manganese (II) titanate formed in step (a) with sodium hydroxide in the presence of steam, to yield sodium titanate, sodium manganate (III), water and hydrogen;

(c) treating sodium titanate and sodium manganate (III) with excess water to yield sodium manganate (III), titanium dioxide and sodium hydroxide;

(d) dissolving sodium hydroxide formed in step (c) and removing the thus-dissolved sodium hydroxide to yield a residue of sodium manganate (III) and titanium dioxide; and (e) recycling the residue of sodium manganate (III) and titanium dioxide to step (a).

In another aspect, this invention relates to a method for producing oxygen comprising reacting sodium manganate (III) and titanium dioxide to yield oxygen, sodium titanate and manganese (II) titanate.

In a further aspect, this invention relates to a method for producing hydrogen comprising reacting manganese (II) titanate with sodium hydroxide, in the presence of steam, to yield sodium titanate, sodium manganate (III), water and hydrogen.

BRIEF DESCRIPTION OF THE DRAWING

The single FIGURE shows the most preferred embodiment of the cyclic process for hydrogen production in accordance with this invention.

DETAILED DESCRIPTION

In the first step of the process, which yields oxygen as a product removable from the reaction environment, sodium manganate (III) and titanium dioxide are reacted, preferably at 600°–1050° C., to produce sodium titanate, manganese (II) titanate and oxygen. This reaction can be represented by the equation:

$$2NaMnO_2 + 3TiO_2 \rightarrow Na_2TiO_3 + 2MnTiO_3 + \tfrac{1}{2}O_2 \qquad (a)$$

Sodium titanate, as used in the specification and claims, means sodium titanate (IV), that is, $Na_2TiO_3$. Other Na—Ti—O compounds may be formed as by-products of the reaction, but $Na_2TiO_3$ is presently believed to be an essential compound in the operation of the cyclic process.

The reaction is carried out by heating the mixed solids in an inert atmosphere, e.g., Ar, preferably at 900°–1000° C. The evolved oxygen is preferably removed from the reaction environment and collected. The residual mixture of titanates is preferably used directly for the next step of the process.

The second step of the process, which yields hydrogen as a product removable from the reaction environment, can be represented by the equation:

$$Na_2TiO_3 + 2MnTiO_3 + 6NaOH \xrightarrow{\text{steam}} \qquad (b)$$
$$3Na_2TiO_3 + 2NaMnO_2 + 2H_2O + H_2$$

or, assuming no reaction of the sodium titanate, by the equation:

$$2MnTiO_3 + 6NaOH \xrightarrow{\text{steam}} 2Na_2TiO_3 + 2NaMnO_2 + \qquad (b')$$
$$2H_2O + H_2$$

This step is preferably carried out at 300°–650° C., most preferably 350°–450° C. The steam pressure is most preferably about 1 atmosphere and hydrogen is preferably removed from the reaction environment and collected.

The third step in the cyclic process can be represented by the equation:

$$3Na_2TiO_3 + 2NaMnO_2 + 3H_2O \rightarrow 2NaMnO_2 + 3TiO_2 + 6NaOH \qquad (c)$$

Although sodium manganate (III) appears to undergo no reaction during this step, it is preferred to carry over the mixture of sodium titanate, sodium manganate (III) and water, without separation, from the prior step. An alternative representation of the reaction carried out in the third step of the process is:

$$3Na_2TiO_3 + 3H_2O \rightarrow 3TiO_2 + 6NaOH. \qquad (c')$$

This step can be carried out at any temperature from 0° C. to 100° C., preferably at 30°–90° C., most preferably 60°–80° C.

The amount of water employed is in excess of that required to react with the titanate, and is preferably such that a concentrated solution of NaOH will be produced. Most preferably, 30–40 moles of water are used for each mole of sodium titanate.

Sodium hydroxide produced in this step will, if necessary, be dissolved in additional water and separated from the insoluble product of this step, titanium dioxide, and sodium manganate (III) carried over from the previous step. The sodium hydroxide solution can be removed by conventional techniques, e.g., filtration or centrifugation. Filtration is preferred, owing to its simplicity.

It is preferred to evaporate the sodium hydroxide solution to dryness and to recycle the sodium hydroxide to the second step of the process. It will be appreciated that water or steam can also be recycled to the second step.

The residue of titanium dioxide and sodium manganate (III) obtained in the third step is preferably not separated, but is recycled directly to the first step.

The advantages of the cyclic process described in this specification include use of a smaller number of chemical species than heretofore, use of fewer reactions than in presently available cycles and use of fewer elements than in most suggested cycles producing hydrogen. Other advantages include lower temperature requirements than for known methods and ease of separating the various products.

The overall reaction sequence can be represented by the summary:

$$2NaMnO_2 + 3TiO_2 \longrightarrow Na_2TiO_3 + 2MnTiO_3 + \tfrac{1}{2}O_2 \qquad (b)$$

$$2MnTiO_3 + 6NaOH \longrightarrow 2Na_2TiO_3 + 2NaMnO_2 + \qquad (b')$$
$$2H_2O + H_2$$

$$\underline{3Na_2TiO_3 + 3H_2O \longrightarrow 3TiO_2 + 6NaOH \qquad (c')}$$
$$H_2O \longrightarrow H_2 + \tfrac{1}{2}O_2$$

DESCRIPTION OF THE PREFERRED EMBODIMENTS

With respect to the cyclical process of this invention, the preferred process is one as above wherein sodium manganate (III) and titanium dioxide are reacted at 600°–1050° C. to yield sodium titanate, manganese titanate (II) and oxygen, which is removed from the reaction environment; sodium titanate and manganese titanate (II) are reacted with sodium hydroxide, in the presence of steam at about 300°–650° C. to yield sodium titanate, sodium manganate (III), water and hydrogen, which is removed from the reaction environment; and sodium titanate and sodium manganate (III) are treated with excess water at about 30°–90° C. and the sodium hydroxide thus formed and dissolved in water is removed from sodium manganate (III) a titanium dioxide by filtration.

A most preferred embodiment is shown in the FIGURE, as above, wherein sodium manganate (III) and titanium dioxide are heated at 900°–1000° C.; manganese (II) titanate and sodium titanate are treated with NaOH and steam at 350°–450° C. at about 1 atmosphere; sodium titanate and sodium manganate (III) are treated with 30–40 moles of water per mole of sodium titanate at 60°–80° C., and sodium hydroxide from step (c) is recycled to step (b).

Without further elaboration, it is believed that one skilled in the art can, using the preceding description, utilize the present invention to its fullest extent. The following specific embodiments are, therefore, to be construed as merely illustrative and not limitative of the remainder of the disclosure in any way whatsoever. In the following examples, the temperatures are set forth uncorrected in degrees Celsius. Unless otherwise indicated, all parts and percentages are by weight.

EXAMPLE 1

The production of oxygen in accordance with equation (a) was demonstrated by heating a mixture of 8.43 g (0.077 mole) of sodium manganate (III) and 9.16 g of titanium dioxide (0.115 mole) in a platinum boat covered with platinum foil. The boat was placed in a quartz combustion tube, which was inserted into a tube furnace. The system was purged with argon to remove air and heated at a rate of about 5.4° C./min. Evolution of oxygen was measured with a Beckman Model 741 oxygen analyzer. Oxygen evolution began at about 595° C. and continued until the temperature reached about 1050° C. Maximum oxygen partial pressure was observed at about 950° C. The yield of oxygen was 295 ml (65.4%). Solid products, identified by X-ray diffraction, were sodium titanate, after $Na_2TiO_3$ manganese (II) titanate, $\beta$-$Mn_2TiO_4$ and other sodium titanates.

EXAMPLE 2

The production of hydrogen in accordance with equation (b) was demonstrated by treating 9.53 g of the solid product of Example 1, equivalent to 30 mmol of Mn (II), with 9.9 g (248 mmol) of NaOH in the presence of steam. The temperature of the mixture of titanates and sodium hydroxide was increased gradually to about 400° C. while injecting steam, at a rate of 3–8 g $H_2O$/min. Evolution of hydrogen was followed using a calibrated Gow-Mac Model 20-150 detector. The volume of hydrogen evolved was 219.3 g (97% of theoretical). Hydrogen evolution began at about 320° C. and reached a maximum partial pressure at about 400° C.

Solid products, identified by X-ray diffraction analysis, were $Na_2TiO_3$, sodium manganate (III) and other sodium titanates.

EXAMPLE 3

The third step of the thermochemical cycle was carried out by treating 12.02 g of the solid product of Example 2 with 50 ml of water at 25° C. The resulting solution of NaOH was removed by filtration from the water-insoluble products. The sodium hydroxide content of the solution, determined by titration with a standard solution of HCl, was 134 mmoles. The solid residue was nearly pure $NaMnO_2$ and $TiO_2$, according to x-ray diffraction analysis.

EXAMPLE 4

Of the solid residue from Example 3, 8.42 g was heated as in Example 1 between 700°–945° C. to yield 70.8 ml of oxygen (94.3% of theoretical).

This experiment indicates the feasibility of recycling the sodium manganate (III) and titanium dioxide from the third step of one thermochemical cycle for producing $H_2$ and $O_2$ to a subsequent cycle.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the scope thereof, can make various changes and modifications of the invention to adapt it to various usages and conditions.

What is claimed is:

1. A cyclic thermochemical process for producing hydrogen comprising the steps of:
   (a) reacting sodium manganate (III) and titanium dioxide to yield sodium titanate, manganese (II) titanate and oxygen:
   (b) reacting sodium titanate and manganese (II) titanate formed in step (a) with sodium hydroxide, in the presence of steam to yield sodium titanate, sodium manganate (III), water and hydrogen;
   (c) treating sodium titanate and sodium manganate (III) formed in step (b) with excess water to yield sodium manganate (III), titanium dioxide and sodium hydroxide;
   (d) dissolving sodium hydroxide formed in step (c) in water and removing the thus-dissolved sodium hydroxide to yield a residue of sodium manganate (III) and titanium dioxide; and
   (e) recycling the residue of sodium manganate (III) and titanium dioxide to step (a).

2. The process of claim 1, wherein sodium manganate (III) and titanium dioxide are reacted at 600°–1050° C. to yield sodium titanate, manganese (II) titanate and oxygen, which is removed from the reaction environment; sodium titanate and manganese (II) titanate are reacted with sodium hydroxide, in the presence of steam at about 300°–650° C. to yield sodium titanate, sodium manganate (III), water and hydrogen, which is removed from the reaction environment; and sodium titanate and sodium manganate (III) are treated with excess water at about 30°–90° C. and the sodium hydroxide thus formed and dissolved in water is removed from sodium manganate (III) and titanium dioxide by filtration.

3. The process of claim 2, wherein sodium manganate (II) and titanium dioxide are heated at 900°–1000° C.; manganese (II) titanate and sodium titanate are treated with steam at 350°–450° C. at about 1 atmosphere; sodium titanate and sodium manganate (III) are treated with 30–40 moles of water per mole of sodium titanate at 60°–80° C., and sodium hydroxide from step (c) is recycled to step (b).

4. The process of claim 1, wherein sodium manganate (III) and titanium dioxide are reacted at 600°–1050° C. to yield sodium titanate, manganese (II) titanate and oxygen, which oxygen is removed from the reaction environment.

5. The process of claim 1, wherein sodium titanate and manganese (II) titanate are reacted with sodium hydroxide, in the presence of steam at about 300°–650° C. to yield sodium titanate, sodium manganate (III), water and hydrogen, which hydrogen is removed from the reaction environment.

6. The process of claim 1, wherein sodium titanate and sodium manganate (III) are treated with excess water at about 30°–90° C. and the sodium hydroxide thus formed and dissolved in water is removed from sodium manganate (III) and titanium dioxide by filtration.

* * * * *